(12) United States Patent
Apfel et al.

(10) Patent No.: US 7,453,868 B2
(45) Date of Patent: Nov. 18, 2008

(54) STRATEGIES FOR SENDING CONTENT TO A TARGET DEVICE

(75) Inventors: Darren A. Apfel, Redmond, WA (US); Suresh Parameshwar, Redmond, WA (US); Sarthak D. Shah, Seattle, WA (US); Zankar P. Thakkar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 158 days.

(21) Appl. No.: 11/275,427

(22) Filed: Dec. 30, 2005

(65) Prior Publication Data

US 2007/0168429 A1    Jul. 19, 2007

(51) Int. Cl.
*H04L 12/66* (2006.01)

(52) U.S. Cl. ............... 370/356; 370/352; 379/88.17

(58) Field of Classification Search ............ 379/88.17, 379/100.12–13, 100.13, 114.05, 142.15, 379/142.17, 157, 201.01–201.02, 201.04–201.05; 370/352–356

See application file for complete search history.

(56) References Cited

U.S. PATENT DOCUMENTS

2006/0069687 A1*   3/2006   Cui et al. ............... 707/10

FOREIGN PATENT DOCUMENTS

KR    20020024235 A1    3/2002

OTHER PUBLICATIONS

Yahoo "Mobile Driving Directions," available at <<http://mobile.yahoo.com/sendsms/dd/info>>, accessed on Feb. 12, 2006, 2 pages.
"Yahoo! Announces Feature To Send Driving Directions To Mobile Phones," Press Release, Feb. 18, 2005, available at <<http://brighthand.com/article/Yahoo_Sends_Directions_To_Phones>>, acccessed on Feb. 12, 2006, 2 pages.

* cited by examiner

*Primary Examiner*—Suhan Ni
(74) *Attorney, Agent, or Firm*—Lee & Hayes, PLLC

(57) ABSTRACT

A strategy is described for forwarding content accessed using a first device to a second device. For instance, the first device can comprise a personal computer and the second device can comprise a mobile telephone. The strategy employs general purpose content-forwarding (CF) functionality. Different providers of content can rely on the same general purpose CF functionality to forward content to the second device, without requiring time-intensive and cumbersome manual modification of the CF functionality for each application.

17 Claims, 11 Drawing Sheets

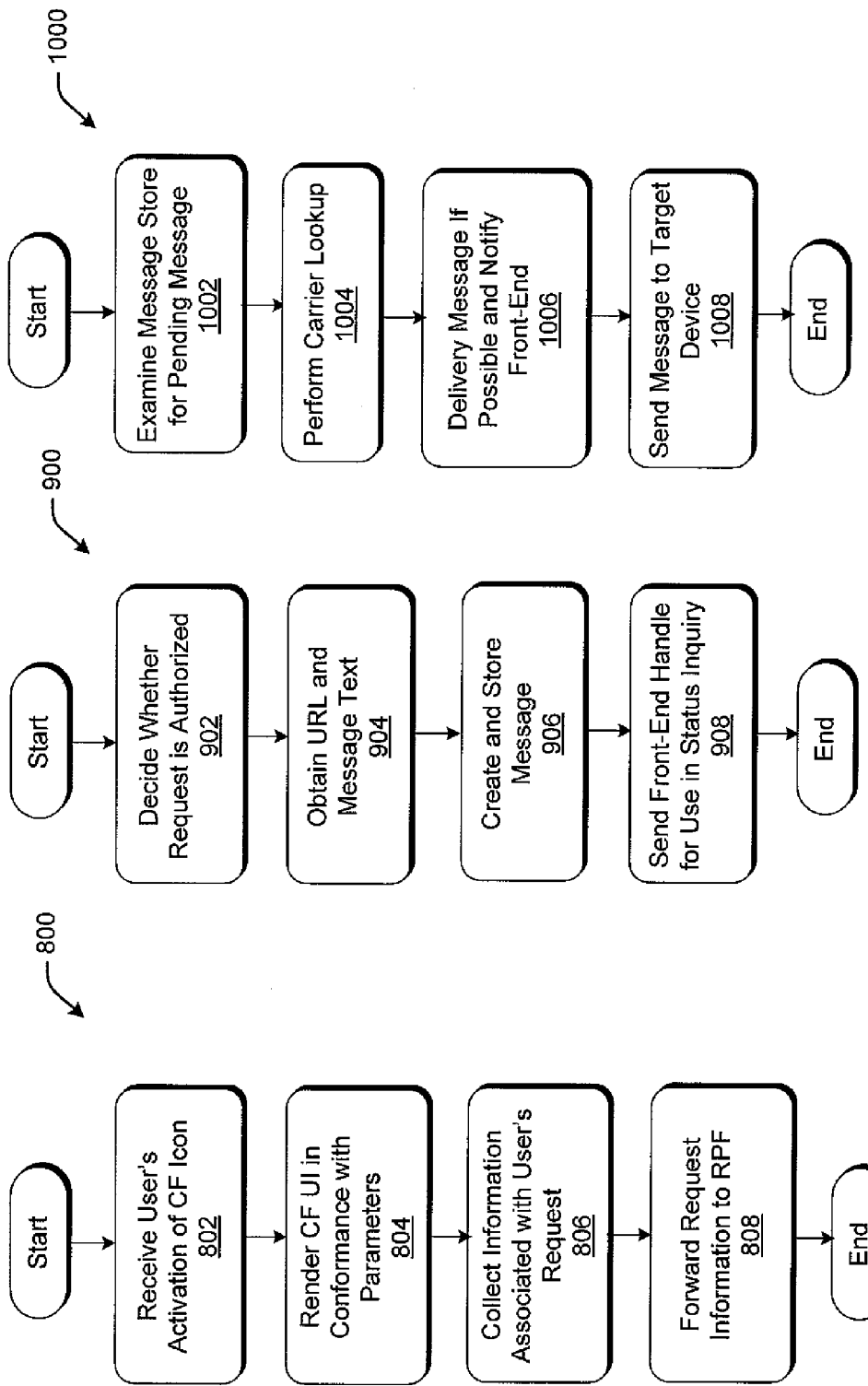

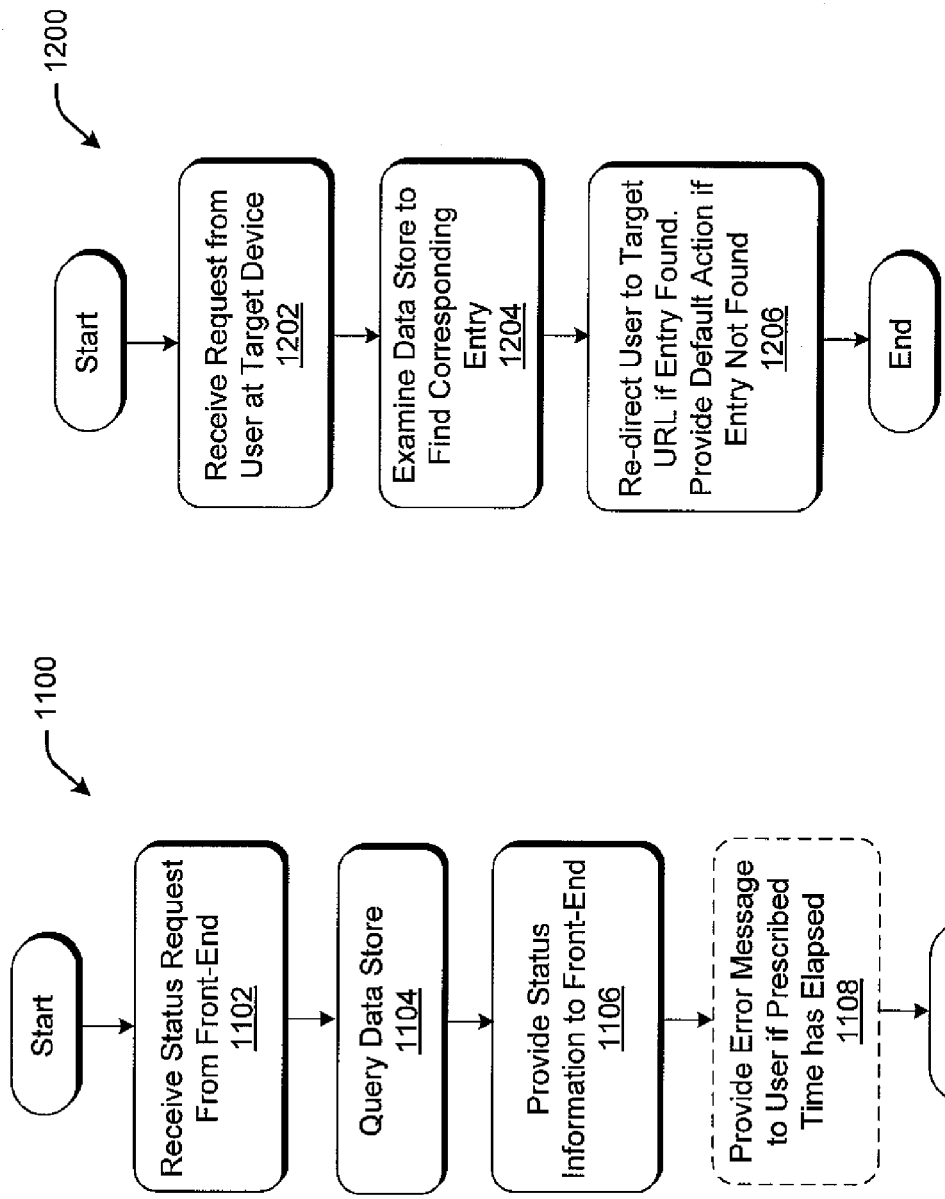

STRATEGIES FOR SENDING CONTENT TO A TARGET DEVICE

BACKGROUND

In some circumstances, a user may wish to access content using a first device and then transfer the content to a second device. For instance, assume that the user is planning to visit a restaurant for dinner. The user may use his personal computer at the office to access a map-related website. From that site, the user may access directions to the restaurant. The user may then wish to transfer these directions to his mobile phone. This will enable the user to access these directions while driving to the restaurant.

Some applications have been developed which address the above need by incorporating a forwarding mechanism. The forwarding mechanism is configured to transfer PC-accessed content to a mobile phone. However, this kind of forwarding mechanism is integrated into the applications, forming part of the code of the applications. This approach may suffer from potential extensibility problems. Namely, suppose that a designer has developed a forwarding mechanism to work with a first application and thereafter wishes to apply a similar mechanism to a second application. This may require the user to perform the potentially time-intensive task of modifying the code of the second application to incorporate the forwarding mechanism. Further, each application has unique characteristics. Accordingly, adding the forwarding mechanism to a new application will likely entail the potentially time-intensive task of custom-modifying the forwarding mechanism itself so that it can properly integrate with the second application.

There is therefore an exemplary need in the art for a more efficient strategy for forwarding content from a first device to a second device.

SUMMARY

A strategy is described for forwarding content accessed using a first device to a second device. For instance, although the strategy is not limited to specific kinds of devices, the first device can comprise a personal computer and the second device can comprise a mobile telephone. The strategy employs general purpose content-forwarding (CF) functionality. Different providers of content can rely on the same general purpose CF functionality to forward content to the second device, without requiring time-intensive and cumbersome manual modification of the CF functionality for each application.

The subject matter described in this Summary section refers to exemplary manifestations of the invention, and hence does not limit the scope of the invention set in the Claims section.

BRIEF DESCRIPTION OF THE DRAWINGS

FIGS. 8-14 show various procedures that explain the operation of different aspects of the system of FIG. 1.

Figure 1:
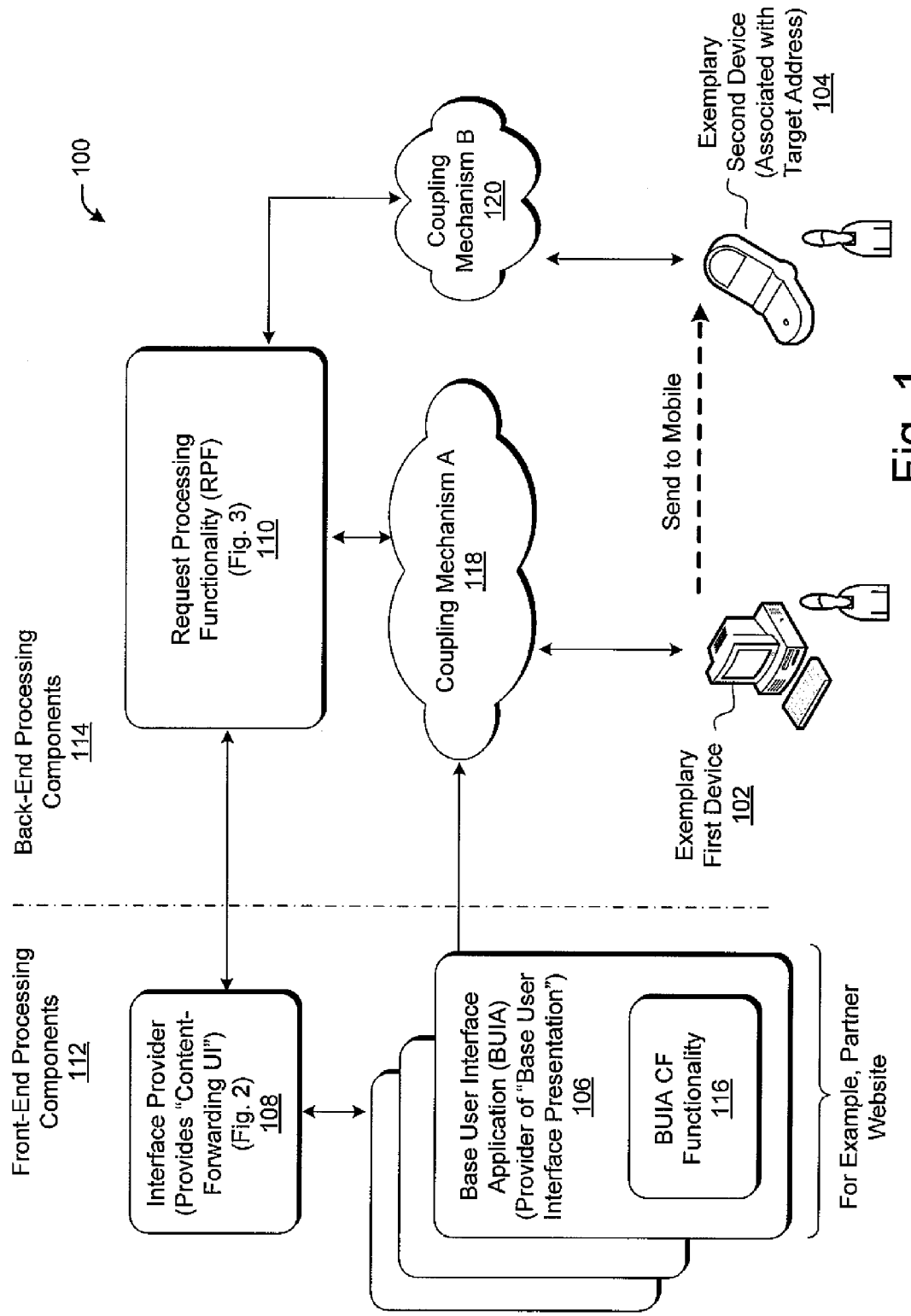
FIG. 1 shows an overview of a system for forwarding content from a first device to a second device using content-forwarding (CF) functionality.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The subject matter set forth herein describes a strategy for sending content to a target address. For instance, the content may be identified using a first device and then forwarded to a second device (also known as a "target device"), wherein the target device is associated with the target address. The strategy employs flexible content-forwarding (CF) functionality that can be applied to a variety of applications without requiring time-intensive manual customization of the CF functionality.

In the scenario most commonly evoked in this description, the first device corresponds to a personal computer (PC) and the second device corresponds to a mobile telephone. However, this scenario is merely exemplary and representative. Generally, the first and second devices can be selected from a broad class of electronic devices, including, but not limited to, personal computers, laptop computers, personal digital assistants (PDAs), mobile telephones, game consoles, set-top boxes, pager-type devices, wearable computing devices, computer-equipped appliances, and so on. For instance, in another scenario, the strategy can be used to send content that is identified using a first personal computer to a second personal computer. In another case, the strategy can be used to send content identified using a small scale electronic device (such as a mobile telephone, etc.) to a full scale computing device (such as a personal computer, etc.).

This disclosure includes the following sections. Section A presents an exemplary system for forwarding content to a target device. Section B presents exemplary user interface presentations that can used to interact with the system of Section A. Section C describes exemplary procedures that explain the operation of different aspects of the system of Section A. And section D describes an exemplary computer environment for implementing aspects of the system of section A.

A. Exemplary System (FIGS. 1-4)

Generally, any of the functions described with reference to the figures can be implemented using software, hardware (e.g., fixed logic circuitry), manual processing, or a combination of these implementations. The term "logic, "module" or "functionality" as used herein generally represents software, hardware, or a combination of software and hardware. For instance, in the case of a software implementation, the term "logic," "module," or "functionality" represents program code (or declarative content) that performs specified tasks when executed on a processing device or devices (e.g., CPU or CPUs). The program code can be stored in one or more computer readable media.

More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, solid state, etc.). The term machine-readable media also encompasses transitory forms of representing information, including various hardwired and/or wireless links for transmitting the information from one point to another.

A.1. Overview of System

FIG. 1 shows one exemplary system 100 that can be used to transfer content to a target device. Namely, one purpose of the system 100 is to identify content using a first device 102, and then to transfer that identified content to a target address associated with a second device 104 (also known as a target device). In the most commonly evoked scenario of this description, the first device 102 corresponds to a personal computer and the second device 104 corresponds to a mobile telephone. However, as mentioned above, the first and second devices (102, 104) can be implemented as any type of device. In the most general terms, the first device 102 and the second device 104 can be regarded as simply a first address and a second (target) address, respectively. In general, the first device 102 may have a first set of processing and presentation characteristics and the second device 104 may have a second set of processing and presentation characteristics (different from the first set). This may require the system 100 to convert content that is identified using the first device 102 to the processing and/or presentation characteristics used by the second device 104. Of course, it will be appreciated that the system 100, in actual practice, will incorporate a great number of devices (not shown), any of which may comprise a source of content and any of which may comprise a recipient (target) of this content.

A user may wish to transfer content to the target device 104 for any number of reasons. The following comprise exemplary and non-limiting usage scenarios:

In one case, the user may identify content using the first device 102 that the user wishes to access using the second device 104 at a later time and potentially in a different setting. For instance, according to the scenario set forth in the Background section, the user may access driving directions or tourist information using a personal computer and then transfer this information to the user's mobile telephone. This enables the user to access this information with his mobile telephone while the user is traveling.

In a more general case, the user can use the first device 102 to transfer any kind of search results to the second device 104.

In another case, the user can use the first device 102 to transfer Email content (or other message content, such as IM content) to the second device 104.

In another case, the user may use the first device 102 to transfer image content to the second device 104. According to one application, the user can use the received image as "wallpaper" (e.g., a background image) for the second device 104.

In another case, the user can use the first device 102 to transfer audio content to the second device 102. According to one application, the user can use the received audio content as a ring tone for a mobile telephone.

In another case, the user can use the first device 102 to transfer configuration information to the second device 104. The configuration information may control the composition and layout of a user interface presentation. Thus, the user can use this technique to duplicate a user interface presentation created using the first device 102 on the second device 104.

In another case, a user can use the first device 102 to transfer contact information to the second device 104. The contact information may comprise a list of telephone numbers and addresses. Or the contact information may comprise business card information, and so forth.

According to one generality, a single user may own or may be otherwise associated with both the first device and the second device. For instance, the user may use his workplace personal computer to transfer content to his personal computer located at his home.

According to an alternative generality, a first user may use the first device 102 to transfer any kind of content to a second user (associated with the second device 104). For instance, in this scenario, a user can transfer content to a friend's personal computer.

Still other usage scenarios are possible. In general, "content," as broadly used herein, can refer to graphical content, image content, textual content, audio content, code-bearing content, markup language content, and so on, or any combination thereof.

The following explanation sets forth an overview of the exemplary composition of the system 100, while later sections provide more detail on selected components of the system 100.

In general, the functionality that allows the system 100 to forward content to the target device 104 is referred to herein as content-forwarding (CF) functionality. This functionality is distributed among a variety of components in FIG. 1, including a base user interface application (BUIA) 106, an interface provider 108, and request processing functionality (RPF) 110. The devices (102, 104) may also optionally incorporate aspects of the CF functionality.

Broadly, the CF functionality can be divided into so-called front-end functionality 112 and back-end functionality 114. The BUIA 106 and the interface provider 108 are associated with the front-end functionality 112, while the RPF 110 is associated with the back-end functionality 114. The front-end functionality 112 is referred to as "front-end" because this functionality 112 "faces" the user by providing an interface through which the user may interact with the system 100. The back-end functionality 114 primarily performs background processing operations that are involved in transferring the identified content to the target device 104.

Each of the above-identified components of the system 100 (the BUIA 106, the interface provider 108, and the RPF 110) are discussed below in turn. Starting with the base user interface application (BUIA) 106, this functionality refers to any kind of application logic, tool, etc. for performing any kind of operation in any kind of application domain. In one case, server-side functionality can implement the BUIA 106. In another case, the device 102 can locally implement the BUIA 106. In another case, both server-side functionality and the device 102 can implement the BUIA 106 in distributed fashion. In one case, the BUIA 106 has a pre-established relationship with the entity that administers the CF functionality. In this case, the BUIA 106 is a "partner" entity that formally cooperates with the entity that administers the CF functionality. In another case, the BUIA 106 can represent any arbitrary content, such as an arbitrary web site. In this case, the entity that hosts the BUIA 106 does not necessarily have a pre-established relationship with the entity that administers the CF functionality.

In any case, the BUIA 106 provides a "base user interface presentation." The base user interface presentation comprises an interface that allows the user to interact with the BUIA 106. A base user interface presentation, in turn, contains a number of components referred to herein as "information items." By way of broad overview, the purpose of the CF functionality is to transfer an information item that is identified using the first device 102 to the target device 104.

An example will clarify the use of this terminology. In one case, the BUIA 106 comprises a web site that provides any kind of application logic that is accessible over the Internet, such as a search-related application. The application logic, in turn, provides a base user interface presentation to the user in the form of one or more user interface pages. For instance, one user interface page comprises a search result page that identifies the results of a search. Each page can include one or more information items. For instance, a search result page can provide a list of search results, and each search result can be regarding as an information item. In the above example, an information item corresponds to information that is visually presented or at least visually referenced by the base user interface presentation. In other cases, selectable information items may correspond to other aspects of the BUIA 106 that do not necessarily have a visual counterpart in the base user interface application.

The system 100 can annotate the base user interface presentation with content-forwarding (CF) icons. Namely, the system 100 can annotate the base user interface presentation by adding CF icons in positional proximity to the information items. Each CF icon can be invoked to provide a so-called content-forwarding (CF) user interface presentation. In other words, a CF user interface presentation is a pop-up that can be invoked by clicking on an associated CF icon. The CF user interface presentation serves as a vehicle that allows the user to forward the identified information item to the target device 104.

To function in this manner, the BUIA 106 may include content-forwarding logic (e.g., executable code), referred to in FIG. 1 as BUIF CF functionality 116. The BUIA CF functionality 116 can control the manner in which the base user interface presentation is annotated with CF icons. For instance, the BUIA CF 116 can load the CF icons and can control where the CF icons are placed in the context of the base user interface presentation. The BUIA CF 116 can also optionally control some aspects of the behavior of the CF icons. For instance, the BUIA CF 116 can coordinate the loading of CF user interface presentations upon the user-activation of respective CF icons. The BUIA CF 116 can be implemented using any technology, such as a JavaScript code module.

Advancing now to the interface provider 108, this component supplies the CF user interface presentations when the CF icons are invoked. In this regard, the interface provider 108 is a central service that supplies CF user interface presentations to many different BUIAs 106. Since the BUIAs have different characteristics, the interface provider 108 is configured to customize the CF user interface presentations that it supplies to suit the unique characteristics of the BUIAs 106. More generally stated, the user activates a CF icon in a specific context. The interface provider 108 tailors the CF user interface presentation that it provides to the BUIA 106 to suit this unique context.

The context may have multiple components or factors. Part of the context pertains to the general nature of the BUIA 106 that the user happens to be interacting with when the user activates the CF icon. For instance, the user may be interacting with a search-related BUIA, as opposed to, say, a photo browsing BUIA. Another part of the context pertains to a specific aspect of the BUIA 106 with which the user is interacting (referred to as a "scenario"). For instance, the user may be interacting with a news mode of the search-related BUIA 106. This news mode thus defines a scenario of the search-related BUIA 106. Another part of the context may pertain to the location at which the user is accessing the BUIA 106 (and/or the location at which the target device 104 is presumed to be located). Another part of the context may pertain to the identity of the entity that hosts the BUIA 106. Still other contextual factors may apply to the user's activation of the CF icon. In any event, the interface provider 108 takes all of these contextual factors into account by providing a user interface presentation which is customized to suit the contextual factors.

According to one exemplary implementation, the interface provider 108 can implement the operations described above by accepting one or more parameters from the BUIA 106. The parameters respectively capture different contextual factors. The interface provider 108 then supplies a CF user interface presentation which is tailored to suit the received parameters. The customization functionality of the interface provider 108 can be implemented using any technology, such as a JavaScript code module.

In greater detail, when the user first clicks on a CF icon, the interface provider 108 supplies an initial CF user interface presentation. The initial CF user interface presentation at least asks the user to input the target address associated with the target device 104. This address can be expressed as a telephone number, Email address, or some other kind of address. The initial CF user interface presentation is customized to suit the contextual parameters that have been passed to the interface provider 108 by the BUIA 106. For instance, the initial CF user interface presentation can request the user to supply the target address in a manner that is customized to the presumed locale of the target device 104.

All of the information collected by the interface provider 108 forms a package that constitutes "request information." The request information generally expresses the user's request that certain identified content be transferred to the target device 104. Upon collecting all of the request information, the interface provider 108 forwards the request information to the request processing functionality (RPF) 110. Thereafter, the interface provider 108 serves a role in querying the RPF 110 regarding the status of the request. The interface provider 108 also provides one or more follow-up CF user interface presentations. These follow-up presentations inform the user of the status of the request.

Advancing now the RPF 110, one purpose of this component is to formulate a message based on the request information, and to deliver the message to the target device 104. The message either contains the identified content and/or allows the user to access the desired content. For instance, in the case that the desired content is simply a JPEG image that the user wishes to use as wallpaper for the target device 104, then the message may include the content itself, namely the JPEG image. In another case, the desired content may pertain to a search result and the message may include a link to that search result. The user may access the search result by activating the link on the target device 104. The RPF 110 processes the user's actions at the target device 104 by supplying the identified content to the target device 104. In another case, parts of the desired content may be directly sent with the message, while other parts of the content may be identified via one or more links identified in the message. To summarize, one purpose of the RFP 110 is to send the message to the target device 104, and another purpose is to optionally interact with the user to allow the user to use the target device 104 to retrieve the content.

The interface provider 108 and RPF 110 can be implemented using different technology. For instance, the interface provider 108 can represent a first server system and the RFP 110 can represent a separate server system. Or the interface provider 108 and RPF 110 can be implemented by the same server system.

The system 100 can use one or more communication mechanisms to perform the above-described operations. Generally, any of the communication mechanisms can include any kind of network (or combination of networks), such as a wide area network (e.g., the Internet), an intranet, Digital Subscriber Line (DSL) network infrastructure, point-to-point coupling infrastructure, mobile telephone communication system, and so on. The coupling mechanisms can generally use or involve any kind of protocol or combination of protocols, and can rely on various hardwired and/or wireless links, routers, gateways, name servers, and so on (not shown).

In the specific exemplary case shown in FIG. 1, the system 100 uses coupling mechanism A 118 and coupling mechanism B 120. Coupling mechanism A 118 can correspond to a wide area network (WAN), such as the Internet. Coupling mechanism B 120 can correspond to a mobile telephone communication system. For instance, in one scenario, the user can access and interact with a website that provides the BUIA 106 via the coupling mechanism A 118 (e.g., the Internet). The content-forwarding message created by this interaction can be ultimately delivered using coupling mechanism B 120 (e.g., the mobile telephone communication system). Although not shown, coupling mechanism A 118 and coupling mechanism B 120 can be integrated so that information can be exchanged between these two mechanisms (118, 120) in any manner.

The architecture and general protocol described above are exemplary and non-limiting. To summarize, in the approach described above, the CF functionality uses CF icons to annotate predetermined information items in a base user interface presentation. Activation of these CF icons prompts the CF functionality to display respective CF user interface presentations, which comprise respective pop-up presentations used to collect request information and convey various status information. In another exemplary approach, the CF functionality can allow the user to designate any content in any base user interface presentation in a free-form and arbitrary manner, such as by clicking on individual items within the base user interface presentation, marking portions of the base user interface presentation using a mouse device, and so on. The items that are selected in this free-form manner are not necessarily pre-annotated with CF icons. Once the user selects an item using this approach, the CF functionality is invoked to display CF user interface presentations in the manner described above. According to one application of this technique, the user can select arbitrary web content and transfer this content to the target device 104. The CF functionality may convert this web content to a format that is best suited for the target device 104 and/or the selected mode of delivering the content to the target device 104.

Another possible variation concerns the manner in which the CF icons are implemented. To summarize the approach described above, BUIAs 106 can rely on the local BUIA CF functionality 116 to render the CF icons themselves. More specifically, in this case, the BUIA CF functionality 116 can display the CF icons at predetermined locations in a base user interface presentation, and then load the CF user interface presentations from the interface provider 108 when the CF icons are activated. But in a possible variation of this approach, the BUIAs 106 can pull both the CF icons and the CF user interface presentations from the interface provider 108.

Another possible variation concerns the hosting site(s) that implement the CF functionality. To summarize the approach described above, the front-end aspects of the CF functionality are split between the BUIA CF functionality 116 located at the BUIAs 106 and functionality provided by the interface provider 108. The BUIAs 106 represent various kinds of applications, such as partner websites or local applications. In another exemplary implementation, aspects of the above-described CF functionality can be implemented by dedicated CF code running on individual user computers. For instance, the first device 102 can incorporate code in a browser toolbar or other kind of application that allows the user to identify information items that should be sent to the second device 104. Invocation of this functionality can prompt the first device 102 to access CF user interface presentations from the central interface provider 108 in the manner described above. In an alternative implementation, each computer can also locally implement one or more aspects of the role served by the interface provider 108, eliminating or reducing the need to access the remote interface provider 108. For example, the system 100 can provide a Simple Object Access Protocol (SOAP) interface (or other kind of interface) to the back-end (114), thus offloading the entire front-end functionality (112).

Still other variations of the architecture and protocol described above are possible. However, to facilitate explanation, the first-mentioned architecture and protocol will be emphasized in the discussion to follow.

A.2. Exemplary Interface Provider

Figure 2:
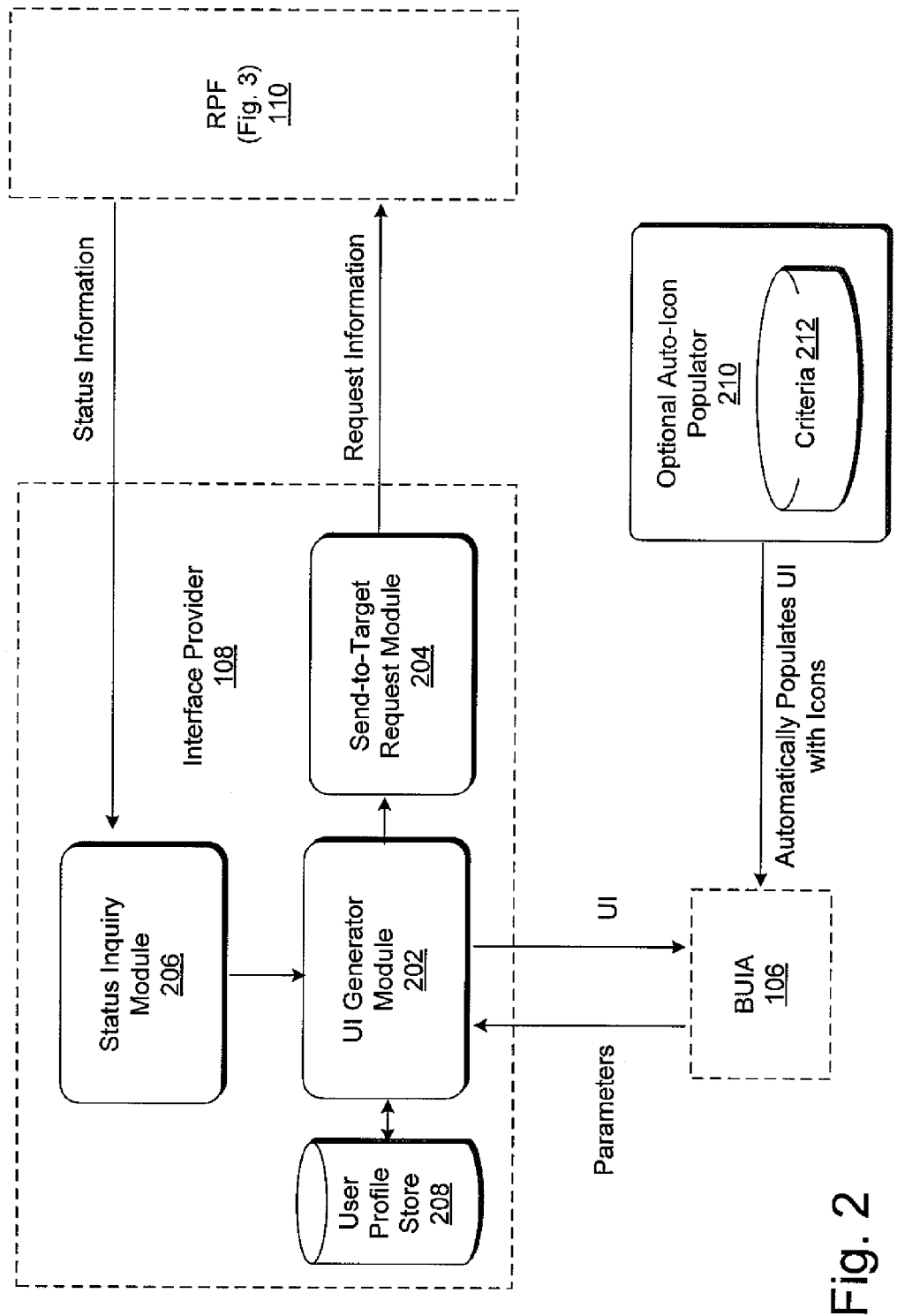
FIG. 2 shows, in part, an exemplary architecture of an interface provider that can be used in the system of FIG. 1.

Advancing to FIG. 2, this figure shows additional details of the interface provider 108, as well as other features.

The interface provider 108 includes a number of components, including a UI generator module 202, a send-to-target request module 204, and a status inquiry module 206.

One purpose of the UI generator module 202 is to generate CF user interface presentations. The CF user interface presentations are customized in the manner described above based on the context in which the user invokes associated CF icons. More specifically, a BUIA 106 supplies one or more parameters to the UI generator module 202 that describe the context, and the UI generator module 202, in response, provides CF user interface presentations that are configured to suit these parameters. As stated above, the interface provider 108 can also use the received parameters to customize other aspects of the CF functionality besides its visual user interface aspects.

The parameters passed to the UI generator module 202 are various depending on different uses of the system 100 in different technical and business environments. In one example, the parameters may include:

Partner ID. This passed parameter describes the entity that administers the BUIA 106.

Application ID. This passed parameter describes the basic nature of the BUIA 106 with which the user is interacting, such as ID1=search application, ID2=Email application, and so forth.

Scenario ID. This passed parameter describes an aspect of the BUIA 106 with which the user is currently interacting.

Locale ID. This passed parameter describes a location, presumably the location of the target device 104.

In those circumstances in which the user has signed into the BUIA 106 or some other service, the UI generator module 202 can also receive credential information that reflects the identity and/or other characteristics of the user.

Name-value pair(s). These passed parameters specify the particular information that the user wishes to send to the target device 104. For example, in the case of a search, the passed name-value pair may comprise: ResultID={GUID representing the result}. In the case of an image application, the passed name-value pair may comprise: Image={URL to original image}. The BUIA 106 can pass one parameter pair or a group of parameter pairs, depending on the particular invoking application and other factors.

Some of the CF user interface presentations provided by the UI generator module 202 are used to collect request information. The request information defines salient aspects of the user's request to transfer content to the target device 104. As a minimum, the request information specifies the address of the target device 104.

In certain cases, the user may have previously specified certain request information, such as the address of the target device 104. This request information can be stored in association with the user's ID information in profile store 208. Or this request information can be stored on a more informal basis, such as in cookie form. In either case, the user's personal data can be encrypted so that this information is not easily available to the user (or any other end user). If this same user signs in again, the UT generator 202 can access the previously stored request information, without requiring the user to input this information again. In this case, the user can simply click on the CF icon to automatically transfer the identified information item to the target device 104.

The send-to-target request module 204 is used to send the collected request information to the RPF 110. The RPF 110 uses the received request information to construct a message, which is then forwarded to the target device 104.

The status inquiry module 206 receives reference information (e.g., a handle) from the RPF 110. The handle is associated with the message created by the RPF 110. The status inquiry module 206 uses this handle to periodically interrogate the RPF 110 to determine the status of the message, e.g., whether the RPF 110 has determined whether it can successfully send the message to the target device 104, and whether the message has actually been forwarded to the target device 104. The status inquiry module 206 also provides status information to the UT generator module 202, which, in turn, forwards this information to the user in one or more CF user interface presentations.

A.3. Auto-Icon Populator

FIG. 2 shows that an optional auto-icon populator 210 can be used to automatically add CF icons to a base user interface presentation provided by a BUIA 106. Namely, for frame of reference, in one technique, a designer can manually select the information items in a particular base user interface presentation that should be annotated with CF icons, and create code (e.g., the BULK CF functionality 116) that populates a base user interface presentation with the CF icons. In contrast, the auto-icon populator 210 works by automatically scanning the base user interface presentation to determine the existence of one or more information items that might be desirable to annotate with CF icons (because these information items might be desirable to send to the target device 104).

To function in this manner, the auto-icon populator 210 can rely on rules set forth in a criteria data store 212. The rules specify the circumstances in which the auto-icon populator 210 will add a CF icon to a base user interface presentation. These rules generally take the form of "if feature X is found in the base user interface presentation, then add a CF icon which identifies the feature X." Specific rules might include:

- A rule can identify content that appears to show user contact information, and then annotate that content with one or more CF icons. For instance, this rule can identify text that has telltale signs, indicating that the text represents a telephone number, Email address, street address, and so forth.
- A rule can identify content that the user might wish to apply as a background image (e.g., wallpaper) for the target device 104, or as a ring tone for the target device 104, and so forth, and then annotate that content with one or more CF icons. For instance, this rule can look for image or audio content having a predetermined file size.
- A rule can identify a prescribed number of top search results, and then annotate those search results with one or more CF icons.

Still further rules can be applied to add CF icons to a base user interface application. In other cases, the auto-icon populator 210 can rely on more advanced tools for identifying information items that should be annotated with CF icons, including artificial intelligence analysis tools, neural network analysis tools, and so forth. Further, the auto-icon populator 210 can include a feedback mechanism that allows an end-user or other person to critique the desirability of the annotation results produced by the auto-icon populator 210. The auto-icon populator 210 can then learn from this feedback to improve its performance in the future. For instance, the auto-icon populator 210 can negatively weight results that have been identified as unsatisfactory, and positively weight results that have been identified as satisfactory. Still other kinds of analysis engines can be used.

The auto-icon populator 210 can also incorporate various rules of a pragmatic nature. For instance, the auto-icon populator 210 can limit the number of CF icons to a prescribed number. In doing so, the auto-icon populator 210 can rank the importance of different information items (based on criteria in the data store 212), and then select the top N items to receive icons.

In one case, the auto-icon populator 210 can be deployed as a web-accessible service. The web service can analyze web pages and other content and add CF icons to this content. In another case, the auto-icon populator 212 can be employed at a local client site. In this application, the auto-icon populator 212 can analyze, at a local level, a web page or other content loaded by the first device 102 and add CF icons to this content. For instance, the auto-icon populator 210 can be added as a tool within a browser tool bar.

In any implementation, functionality can be included for allowing the user to activate and deactivate the auto-icon populator 210. When the populator 210 is activated, the populator 210 can refresh the base user interface presentation with the CF icons intact. When the populator 210 is deactivated, the populator 210 can refresh the base user interface population with the CF icons removed.

A.4. Exemplary Request Processing Functionality

Figure 3:
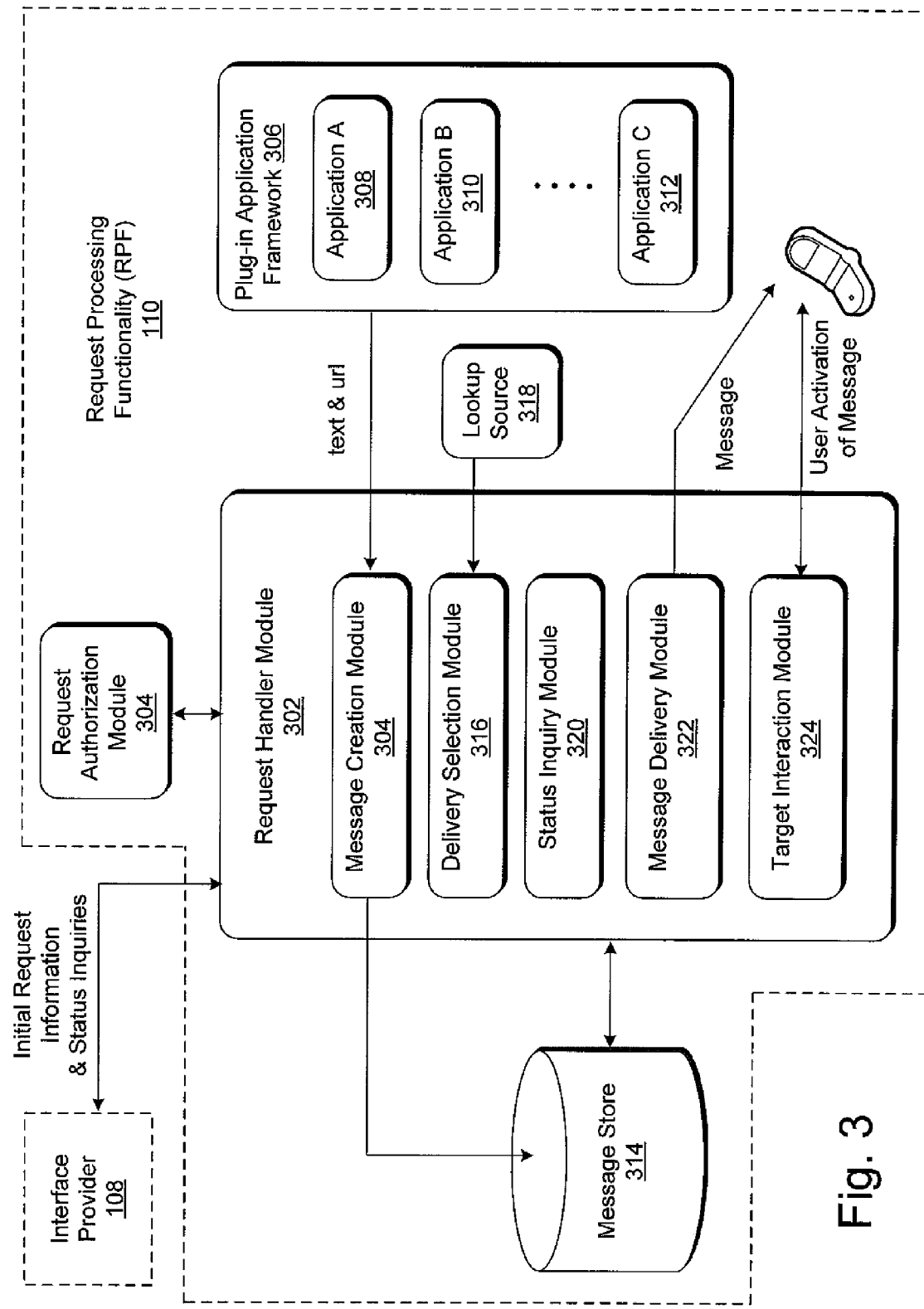
FIG. 3 shows an exemplary architecture of request processing functionality (RPF) that can be used in the system of FIG. 1.

FIG. 3 shows exemplary contents of the request processing functionality (RPF) 110. The RPF 110 can include several components. As a main component, the RPF 110 can include a request handler module 302. The basic purpose of the request handler module 302 is to receive request information from the interface provider 108, formulate the request information into a message, deliver the message to the target device 104, and then field any interaction with the target device 104 associated with the delivered message.

To begin with, the request handler module 302 can interact with a request authorization module 304. One purpose of the request authorization module 304 is to determine whether the user is authorized to forward the identified content to the target device 104. This operation can be performed for signed-in users by consulting one or more data stores (not shown) of user profile information. The user profile information may indicate whether a particular user (identified by a user ID) is permitted to transfer content to a particular target device. The authorization module 304 can determine the identity of the user as a result of the user signing into the BUIA 106 or as a result of the user signing into some other application or service.

If the user is permitted to transfer content, a message creation module 304 is used to formulate a message to be sent to the target device 304. As stated above, the message can directly provide the content to be sent to the target device 104, and/or simply reference the content that can be later accessed by the target device 104.

One way that the message creation module 304 can construct the message is using a plug-in application framework 306. The plug-in application framework 306 includes various plug-in application modules (308, 310, . . . 312). Each of these application modules (308, 310, . . . 312) pertains to a different BUIA 106. For example, one application module might pertain to a search application, while another might pertain to a photograph browsing application, and so on. The purpose of each application module (308, 310, . . . 312) is to supply a URL and/or message content associated with the content that the user wishes to forward to the target device 308. Different application modules (308, 310, . . . 312) are used because different applications may apply different rules to the selection of URLs and message content. In one case, the message content can comprise generic alpha-numeric and/or graphic content. The content can include wildcard entries that allow this message content to be customized to suit specific content-forwarding scenarios.

The message that is sent to the target device 104, however, may or may not include all of the specific URL and message content supplied by the plug-in application framework 306. For instance, some restrictive protocols (such as transport via a single SMS packet) may not readily accommodate the transmission of URL information to the target device 104. To accommodate this issue, the message creation module 304 can assign a shorthand reference identifier to the message, such as a miniguid, and can then send this miniguid to the target device 104 in lieu of the actual URL. When the user activates the miniguid at the target device 104, the request handler module 302 can map this miniguid back into the actual URL, and thus redirect the user to the desired content associated with the actual URL.

At this initial stage, however, the message creation module 304 merely stores the message in a message store 314. More specifically, the message store 314 can store various information associated with the message, such as the request information used to construct the message, the actual URL and message content retrieved from the plug-in application framework 306, and the miniguid assigned by the message creation module 304. This message store 314 can serve as a mapping table for finding the actual URL of the desired content based on a miniguid received from the target device 104. When the message is first stored in the message store 314, it is flagged with the status of "pending carrier lookup."

As to the topic of carrier lookup, the request handler module 302 includes a delivery selection module 316. One purpose of the delivery selection module 316 is to map the address information (such as the telephone number) entered by the user via the CF user interface presentation into a carrier that can be used to deliver the message and its optional linked contents to the target device 104. To perform this function, the delivery selection module 316 can rely on various known services which performing this mapping function.

In addition, the delivery selection module 316 can provide a list of possible delivery methods that the carrier supports. Exemplary delivery methods include WAP Push protocol (where WAP stands for Wireless Application Protocol), SMS (where SMS stands for Short Message Service), SMTP (where SMTP stands for Simple Mail Transfer Protocol), MMS (Multimedia Message Service), and so on. The delivery selection module 316 can assign different preference scores to each of these protocols. These scores may vary depending on a number of contextual factors, including the identity of the carrier being used, the nature of the content being transferred, the nature of the target device 104 (if known), and so forth. The delivery selection module 316 can then select the most preferred method of delivery corresponding to the protocol having the highest score. In one case, the selected delivery method determines the basic manner in which content is transferred to the target device 104. For example, assume that the content corresponds to an image. If a first delivery method is selected, then the image can be sent along with the message itself. If a second delivery method is selected, then a link can be sent to the image as opposed to the image itself.

Finally, the delivery selection module 316 (or possibly another module in the request handler module 302) can optionally format the message and/or its optional linked contents to best suit the carrier and selected delivery protocol that will be used to perform the delivery, and/or the target device 104 that will receive the message (if known).

In one case, the delivery selection module 316 can operate by periodically scanning the message store 314 for any entries having a "pending carrier lookup" status. The delivery selection module 316 can perform carrier lookup for these entries.

A status inquiry module 320 is used to supply status information to the interface provider 108 regarding the status of message delivery. The interface provider 108, in turn, forwards this status information to the user via one or more CF user interface presentations. Namely, when the message is first created and stored, the status inquiry module 320 can return a handle to the interface provider 108 that is associated with the message. The interface provider 108 can thereafter use this handle to query the RPF 110 to determine the status of the delivery. When the interface provider 108 makes such an inquiry, the status inquiry module 320 responds by providing status information to the interface provider 108.

When the message is first created it is assigned the status of "pending carrier lookup." When the carrier has been successfully determined, the status can change to "pending delivery." When the message is actually delivered, the status can change to "delivered." Various errors may occur in this process. For instance, a suitable carrier may not exist to deliver the message to the identified target device 104. In this case, the status inquiry module 320 can return various error messages to the interface provider 108, and the interface provider 108 can forward these error messages to the user in various CF user interface presentations.

A message delivery module 322 performs the task of delivering the message in the message store 314 to the target device 104. It can perform this task by periodically scanning the message store 314 to identify messages that are ready to be sent to the target device 104, and then sending those messages. A message is ready to send to the target device when its status reflects that the carrier lookup operation has been successfully performed for this message.

The remaining component of the request handler module 302 is a target interaction module 324. The purpose of the target interaction module 324 is to interact with the target device 324. For instance, the message received by the target device 104 can include one or more links. When the user activates one of these links, the target device 104 forwards information back to the target interaction module 324. The target interaction module 324 then processes the target device 104's request by accessing and supplying whatever content is associated with the activated link.

In one case, the message sent to the target device 104 by the delivery module 322 may provide the actual URL of the linked content. In this case, the target interaction module 324 can receive this URL back from the target device 104, and can then use this URL to directly retrieve the content associated with the link. In another case, the message may provide a miniguid, which is a shorthand reference to the actual URL. To retrieve the actual URL, the target interaction module 324 can use the miniguid as a mapping reference to locate the actual URL. The message store 314 can provide this mapping capability. The content associated with the actual URL can then be retrieved and sent to the target device 104.

In one case, the message store 314 retires (e.g., deletes) items in the message store after a prescribed amount of time, such as after three weeks. Thus, if the user activates a message received at the target device 104 within the three week interval, the mapping can be successfully performed. If the user activates the message after the three week interval, the mapping may be unsuccessful. In that event, the target interaction module 324 can direct the user to a default page, such as a default page associated with the carrier. The carrier can be identified in various ways. In one case, the miniguid sent to the target device 104 can include a reference to the carrier, as well as other parameter information. This allows the target device 104 to access the default page. Directing the user to the default page is potentially useful from a marketing perspective. For instance, the default page can optionally attempt to interest the user in one or more services.

In response to a request from the target device 104, the target interaction module 324 can utilize the delivery selection module 316 to format the content sent to the target device 104 to best suit the characteristics of the target device 104 (and/or the protocols used to deliver the content to the target device 104). For instance, assume that the target device 104 is a small scale device, such as a mobile phone, with a small user interface. The delivery selection module 316 can condense information in a full scale information item so that it "fits" onto the screen of the target device 104. In general, the target interaction module 324 and the delivery selection module 316 can cooperatively perform such conversion by reformatting certain user interface features, simplifying certain user interface features (e.g., by filtering and omitting certain features), enhancing certain user interface features (e.g., by adding certain features), changing the markup language associated with the user interface features (e.g., by converting to WML, XHTML, cHTML, etc., instead of HTML), and so on. Information about the target device 104 can be conveyed, for example, when the target device 104 contacts the RPF 110 to retrieve specific content associated with a message. For instance, information about the target device 104 can be conveyed by various parameters in the target device 104's request.

A.5. Exemplary User Device

Figure 4:
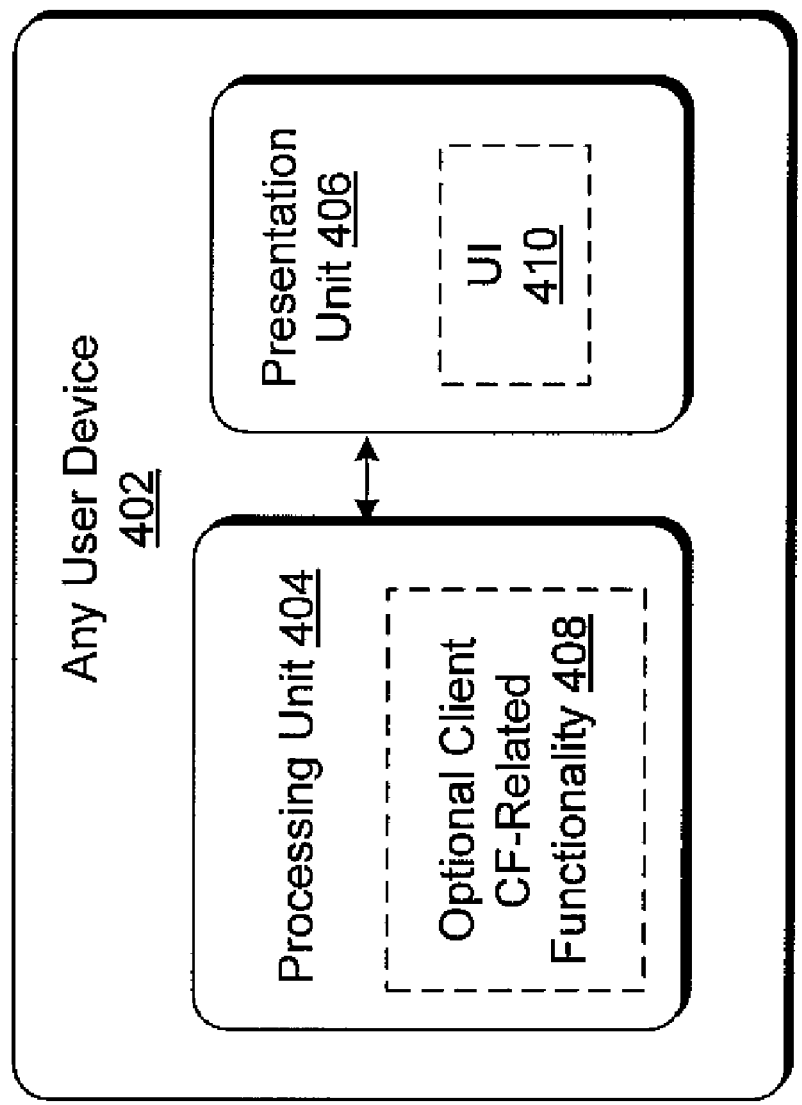
FIG. 4 shows an exemplary architecture of a user device that can be used in the system of FIG. 1.

FIG. 4 shows the exemplary components of an exemplary user device 402, such as the representative first device 102 or the second device 104.

The user device 402 includes a processing unit 404 coupled to a presentation unit 406. The processing unit 404 comprises any data processing functionality for performing various ascribed tasks. The presentation unit 406 provides any kind of output mechanism by which a user can interact with the processing unit 404.

In the context of the present invention, the processing unit 404 can optionally include client CF-related functionality 408. In the case of the first device 102, this functionality 408 can perform various operations related to the delivery of content to the target module 408. In one case, the client CF-related functionality 408 can implement one or more aspects of the BUIA 106, including the BUIA CF functionality 116. (But in other cases, as discussed, the BUIA 106 can be implemented by a remote partner website, etc.).

In another case, as mentioned above, one or more aspects of the CF functionality (such as the BUIA CF functionality 116) can be incorporated in browser functionality that is locally implemented by the user device 402. For instance, this browser functionality can be configured to activate or de-activate the CF functionality. When activated, the CF functionality will display the CF icons and CF user interfaces presentations in the base user interface presentation. When de-activated, the CF functionality will not display this CF information. Various CF-related commands can be incorporated into the browser's toolbar.

In another case, aspects of the auto-icon populator 210 (of FIG. 2) can be implemented at the local level by the user device 402. Again, this functionality can be incorporated into a local browser. The functionality can scan base user interface presentations that are loaded by the user device 402 and appropriately annotate these presentations with CF icons. (However, as described above, these auto-populator operations can also be performed by one or more remote sites; in this implementation, the user device 402 can receive a base user interface presentation that is already annotated with CF icons.)

The presentation unit 406 can provide visual output, audio output, tactile output, any combination of such outputs, and so forth. For instance, the presentation unit 406 can present a user interface 410 that provides visual output to the user (e.g., in the form of one or more graphical user interface presentations). The user interface 410 can be used to present the user interface presentations based on logic stored at the device level, at a remote server level, or at a combination of the device level and remote server level. Users can interact with the user interface presentations through various input mechanisms, such as keyboard, mouse device, touch screen, and so forth. Alternatively, the user interface 410 can be implemented in whole or in part by audio mechanisms, e.g., by allowing the user to interact with the system 100 through verbal exchange of information.

B. Exemplary User Interface Presentations (FIGS. 5-7)

Figure 5:
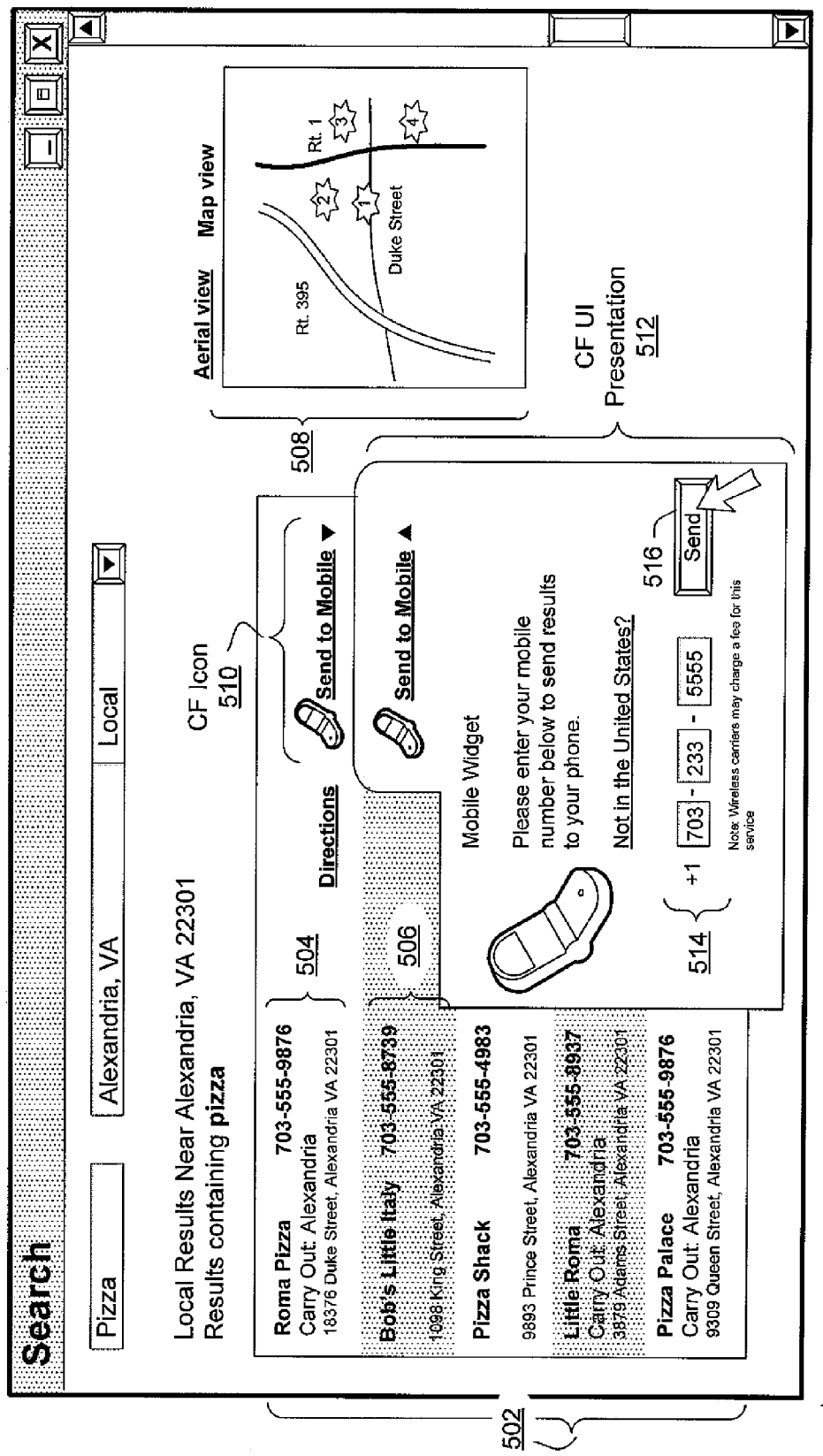
FIGS. 5, 6A, 6B, 6C, 6D, and 6E show various user interface presentations provided by a first device used in the system of FIG. 1.
Figure 6A:
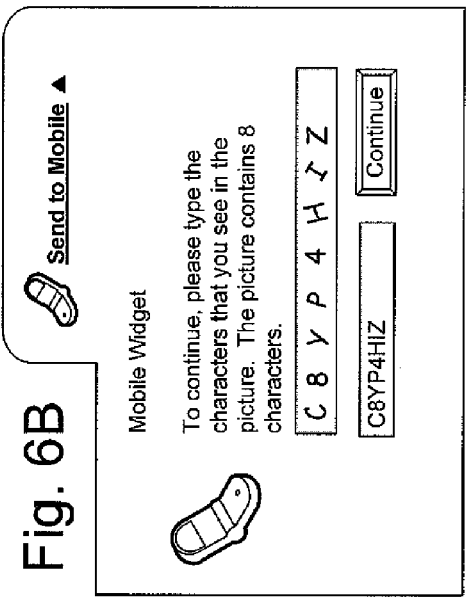
Figure 6B:
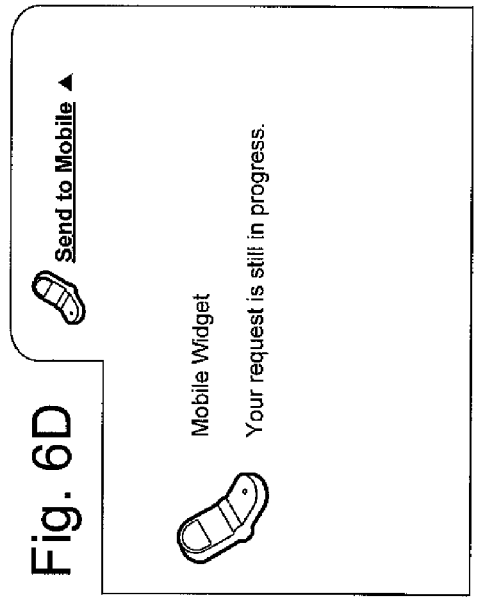
Figure 6C:
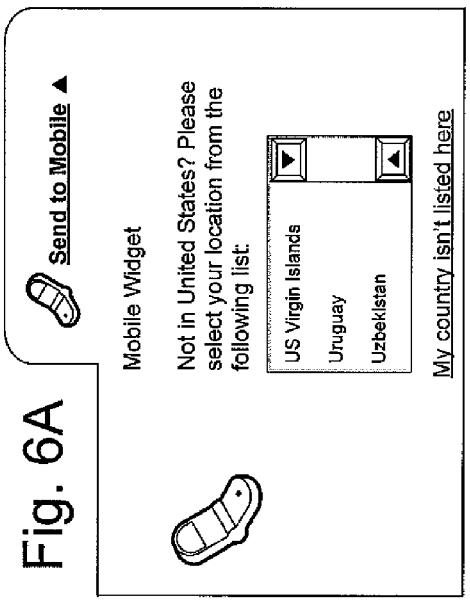
Figure 6D:
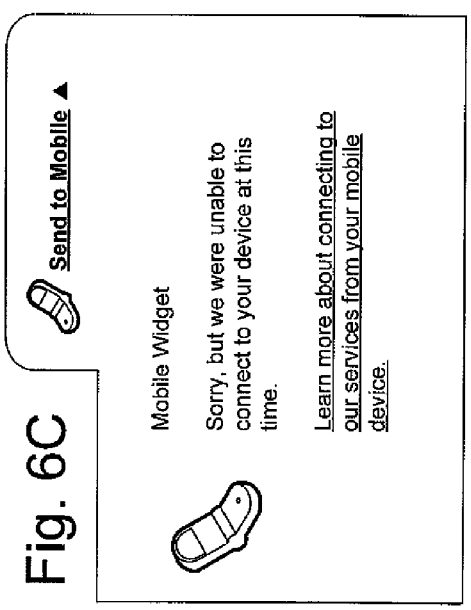
Figure 7:
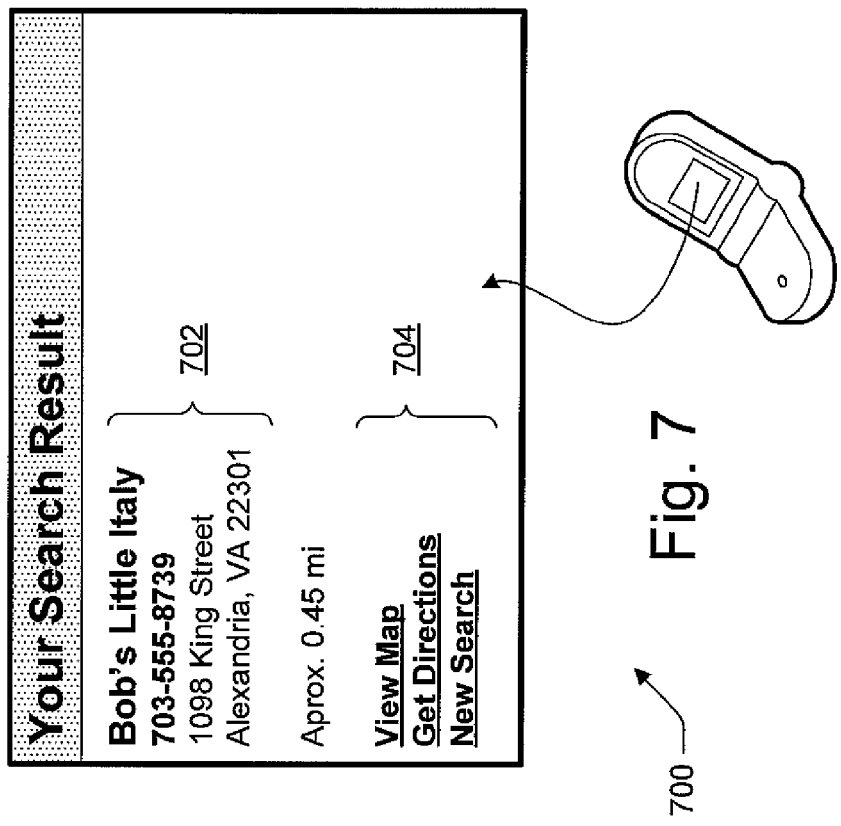
FIG. 7 shows a user interface presentation provided by a second device used in the system of FIG. 1.

FIG. 5-7 provides exemplary user interface presentations that a user can use to interact with the system 100. The reader will appreciate that the style, organization and content of these user interface presentations can be changed to suit different technical and business environments.

B.1. Annotation of Base User Interface Presentation with CF Icons and CF User Interface Presentations To begin with, FIG. 5 shows one exemplary user interface presentation 500 that can be provided by the BUIA 506. The user interface presentation 500 can be displayed on the user interface 410 of the first user device 102. From a broad perspective, this user interface presentation 500 corresponds to what is being referred to above as a "base user interface presentation."

The BUIA 106 of FIG. 5 provides a search function. In this specific exemplary scenario, the user desires to determine the locations of pizza restaurants that are near his present location, Alexandria, Va. The user therefore enters various search terms, such as "Pizza," and "Alexandria, Va." In return, the user receives a list of search results 502 which match the search terms. Each search result comprises an information item. For instance, the first two search results (504, 506) comprise two respective information items. The user interface presentation can also present a map 508 which shows the locations of one or more of the restaurants identified in the search results 502.

Each of the information items in the search results 502 is annotated with a CF icon. For instance, information item 506 is annotated the with CF icon 510. This CF icon 510 bears the label "Send to mobile," informing the user that he can activate this icon 510 to send the information item 504 to the target device 104 (e.g., a mobile telephone). The visual appearance of the CF icon 510 is intended to be representative and non-limiting; the visual appearance can be varied to a great extent depending on a number of environmental considerations.

The base user interface presentation can be annotated with CF icons using different approaches. In one approach, a designer can write fixed code that adds CF icons to respective search results. In another approach, the auto-icon populator 210 can be used to automatically analyze the contents of the base user interface presentation and to add CF icons to those information items that match predefined rules in the data store 212. The second approach is accordingly more flexible than the first approach.

In the use scenario shown in FIG. 5, the user intends to send the second information item 506 to the target device 104. To perform this operation, the user clicks on the CF icon associated with the second item 506. This, in turn, prompts the system 100 to display a CF user interface presentation 512. As discussed above, the interface provider 108 provides the CF user interface presentation 512. Thus, the resultant user interface presentation that is provided to the user is an aggregate of the base user interface presentation and the CF user interface presentation. These two user interface components may originate from two different sources in the manner described above.

The purpose of this initial CF user interface presentation 512 is to collect request information from the user. More specifically, the CF user interface presentation 512 includes an address entry field 514 designed to solicit address information from the user. The address information identifies the address of the target device 104 that will receive the content. The CF user interface presentation 512 also includes a send command button 516, which instructs the interface provider 112 to forward the collected request information to the RPF 110 for processing.

As explained at length in previous sections, the interface provider 108 customizes the CF user interface presentation 512 to suit the context in which the user invokes the corresponding CF icon. The context can be expressed as one or more parameters that are supplied to the interface provider 108. The CF interface presentation 512 is customized, for instance, in response to a parameter that reflects the locale of the target device 104. For instance, the format of the address entry field 514 is configured to receive a telephone number for a delivery zone within the United States.

B.2. Exemplary Other Types of CF User Interface Presentations

FIGS. 6A-6E provide various other types of CF user interface presentations. These presentations are provided to the user subsequent to the presentation of the CF user interface presentation 512 of FIG. 5, providing that certain conditions are met.

In the case of FIG. 6A, the user has activated a "Not in the United States" link in the CF user interface presentation 512 of FIG. 5. This prompts the interface provider 108 to display a CF user interface presentation that gives the user the option of selecting another locale.

In the case of FIG. 6B, the interface provider 108 can optionally administer various security operations to ensure that the user is authorized to interact with the system 100. In the case of FIG. 6B, the interface provider 108 presents a user interface presentation that asks the user to successfully complete a HIP (Human Interaction Proof) input procedure. HIP refers to a user interface presentation that displays characters that only a human can understand and repeat back. The use of such a presentation reduces the risk that an automated application can exploit the CF functionality for inappropriate purposes.

In the case of FIG. 6C, the interface provider 108 informs the user that the RPF 110 was unable to connect to the user's target device 104 at this time for one or more reasons. For instance, the RPF 110 may have been unsuccessful in finding a carrier that can delivery a message to the target device 104. In the event of this failure, the CF user interface presentation shown in FIG. 6C can direct the user to other mobile-related services offered by the entity which sponsors the CF functionality or by some other entity. This allows the CF-sponsoring entity to potentially leverage the failure into a marketing opportunity.

In the case of FIG. 6D, the interface provider 108 informs the user that the request is still pending, meaning that the message has not yet been delivered to the user's target device 104.

Figure 6E:
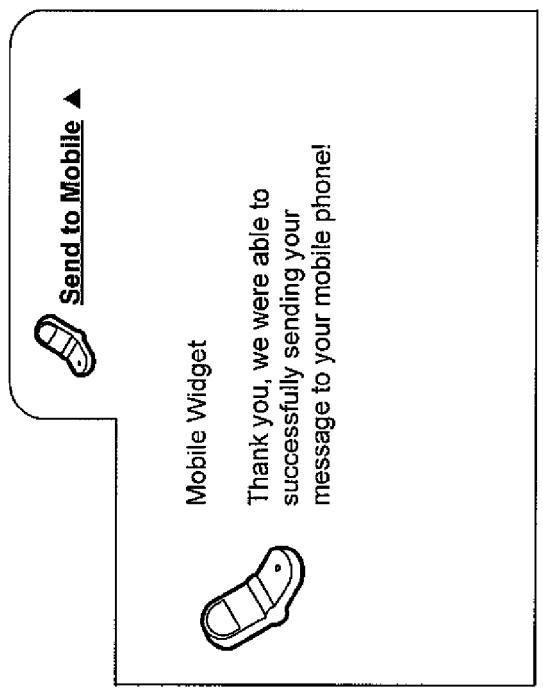

And finally, in the case of FIG. 6E, the interface provider 108 informs the user that their request is successful, meaning that the message has been delivered to the user's target device 104.

B.3. Exemplary Target Device User Interface Presentation

FIG. 7 shows an exemplary user interface presentation 700 that is displayed on the user interface of the target device 104. The target device 104 in this case corresponds to a small scale device, such as a mobile telephone. In this exemplary and non-limiting case, the user interface presentation 700 provides textual information 702 corresponding to the information item 506 in the list of search results 502 of FIG. 5.

The user interface presentation can also include one or more links 704 associated with the search result. The links 704 can allow the user to access a map associated with the search result, retrieve directions associated with the search result, and optionally perform a new search. When the user activates one of these links 704, the user's target device 104 sends message parameters back to the RPF 110. The message parameters can include at least an identifier corresponding to the link that has been activated, along with miniguid information (that, in turn, was forwarded to the target device 104 by the RPF 110). The RPF 110 can then map the miniguid information into the actual URL associated with the link, and provide the requested content to the user at the target device 104.

C. Exemplary Processes (FIGS. 8-14)

FIGS. 8-14 show procedures that explain an exemplary manner of operation of the system 100 shown in FIG. 1. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure. As the exemplary manner of operation of the system 100 has already been set forth in the preceding sections, this section will serve primarily as a review.

C.1. Collecting Request Information

FIG. 8 shows a procedure 800 for forming a request. The request instructs the RPF 110 to forward identified content to the target device 104.

In step 802, the system 100 receives the user's activation of a CF icon in a base user interface presentation provided by the BUIA 106. The CF icon is associated with an information item that the user intends to send to the target device 104. Activation of the CF icon prompts the BUIA 106 to forward one or more parameters to the interface provider 108. The parameters describe the context in which the user has activated the CF icon, including application ID, scenario ID, locale, one or more name-value pairs, and so forth.

In step 804, the interface provider 108 renders the CF user interface presentation in conformance with parameters forwarded to the interface provider 108.

In step 806, the interface provider 108 receives information from the user using the supplied CF user interface presentation. Such information includes, for instance, the address of the target device 104. This operation can be omitted if the user has supplied his address information on prior occasions, and if the user is presently signed in (or the identity of the user can be inferred from some other mechanism). Information about the user can be stored in a dedicated user profile store 208, using cookie-based technology, or in some other fashion.

In step 808, the interface provider 108 supplies the collected request information to the RPF 110 for processing.

C.2. Creation of a Message

FIG. 9 shows a procedure 900 for creating a message based on the request information received from the interface provider 108.

In step 902, the RPF 110 uses the authorization module 304 to decide whether the request is authorized. This operation can be performed, when the user has signed in, by accessing one or more data stores to determine whether the user has been given authorization to send content to an identified target device 104.

In step 904, the RPF 10 accesses a URL and text content for use in constructing the message. The RPF 110 can rely on the plug-in application framework 306 to retrieve this information. The RPF 110 may specifically consult an application module in the framework 306 that is associated with the type of BUIA 106 being used.

In step 906, the RPF 110 can store the constructed message in the message store 314. In addition, the RPF 110 can create and store a miniguid in the message store 314. The miniguid serves as a shorthand reference to the message, from which the actual URL can be retrieved. It is preferable to send the miniguid in lieu of the actual URL to the target device 104 to accommodate the use of various restrictive protocols. But it is also possible to send the actual URL with the message, in which case the miniguid mapping procedure can be omitted.

In step 908, the RPF 110 sends a handle to the interface provider 108. The handle is associated with the message. The interface provider 108 uses the handle to determine the status of the user's request.

C.3. Sending the Message to the Target Device

FIG. 1000 shows a procedure 1000 for sending the message stored in the message store 314 to the target device 104.

In step 1002, the RPF 110 examines the messages in the message store 314 that are pending carrier lookup. The message created in step 906 is initially given a "pending carrier lookup" status.

In step 1004, the RPF 110 performs carrier lookup on the message created in step 906. In addition to identifying a carrier that should be used to deliver a message, the RPF 110 can determine a preferred protocol for sending the message to the target device 104, including any one of SMS, WAP Push, SMTP, MMS, and so on. Moreover, the RPF 110 can determine whether any reformatting of the content needs to be performed to deliver the message.

In step 1006, the RPF 110 changes the status of the message if the message has passed the carrier lookup operation of step 1004. Lookup is successful when at least one carrier and at least one delivery protocol is available for use in sending the message to the target device 1004.

In step 1008, subsequent to successful carrier lookup, the RPF 110 sends the message to the target device 1008.

C.4. Status Inquiry

FIG. 11 shows a procedure 1100 for investigating the status of message delivery.

In step 1102, the RPF 110 receives a status request from the interface provider 108.

In step 1104, the RPF 110 queries the message data store 1104 to determine the status of the identified message.

In step 1106, the RPF 110 provides status information to the interface provider 108.

In step 1108 generally indicates that the interface provider 108 may provide an error message to the user if a prescribed amount of time has passed without receiving indicate on of a successful delivery of the message from the RPF 110.

C.5. Activation of Content Sent to Target Device

FIG. 12 shows a procedure 1200 by which the target device 104 can retrieve content based on the message it has received.

In step 1202, the RPF 110 receives a request from the target device 104 to retrieve content. For instance, this step may reflect the fact that the user has activated a link in a message received from the RPF 110, and the user thereby wishes to retrieve content associated with this link.

In step 1204, the RPF 110 examines the message store 314 to map a miniguid supplied by the target device 110 to the actual URL of the desired content.

In step 1206, the RPF 110 redirects the user to the desired content associated with the URL. On the other hand, if the miniguid has expired or another error occurs, then the RPF 110 can redirect to the user to a default page. In one case, the RPF 110 redirects the user to a default page associated with the carrier of the target device 104. The miniguid itself can include address information that identifies the carrier of the target device 104.

In other cases, the message sent to the target device 104 includes the actual URL of the desired content. In these cases, the target device 104 can retrieve the content without performing the message storage and mapping procedure described above (based on the miniguid). This also means that the URL information sent to the target device 104 does not necessarily expire (as does the miniguid information in message store 314). Another benefit of this approach (of sending the actual URL) is that the URL may be more comprehensible (e.g., informative) to a user (compared to a miniguid).

C.6. Automated Annotation of Base User Interface Presentation with CF Icons

Figures 13, 14:
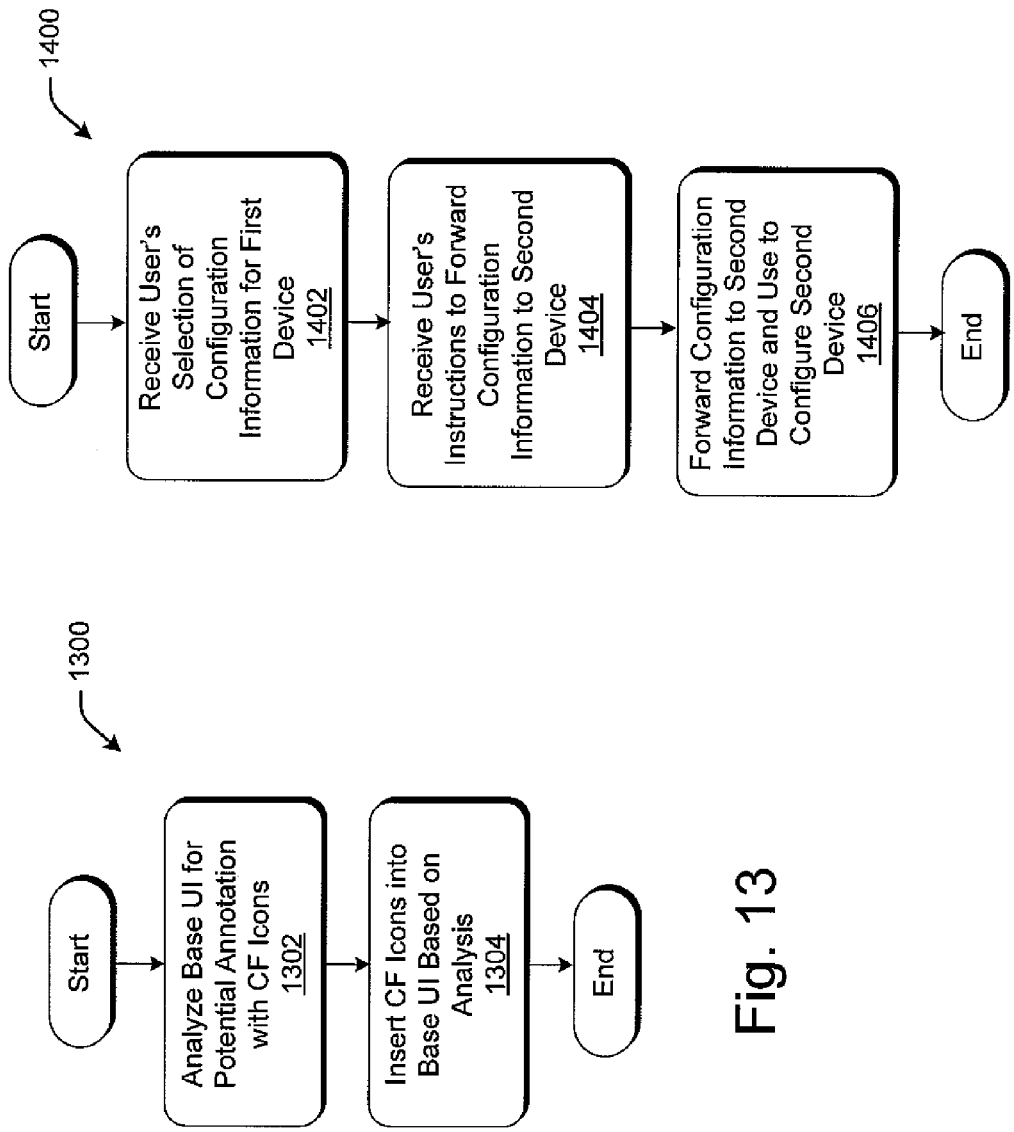

FIG. 13 shows a procedure 1300 for automatically populating a base user interface presentation with CF icons.

In step 1302, the auto-icon populator 210 examines a base user interface presentation for information items that should be annotated with CF icons. The auto-icon populator 210 can rely on rules in a data store 212 to make this determination.

In step 1304, the auto-icon populator 210 inserts CF icons into the base user interface presentation based on the analysis of step 1302.

C.7. Sending Configuration Information to Target Device

FIG. 1400 shows a procedure for sending configuration information created using the first device 102 to a second device 104.

In step 1402, the system 100 receives the user's selection of configuration information, used to configure a user interface presentation for display at the first user device 102.

In step 1404, the system 100 receives the user's instructions to forward the configuration information created for the first device 102 to the second device 104.

In step 1406, the system 100 forwards the configuration information to the second device 104. At the second device 104, the configuration information can be used to configure a user interface presentation for the second device 104 in a manner similar to the configuration created for use by the first device 102.

Note that the configuration procedure 1400 shown in FIG. 14 can be performed even though the user may not be signed into the system 100.

D. Exemplary Computer Environment (FIG. 15)

Figure 15:
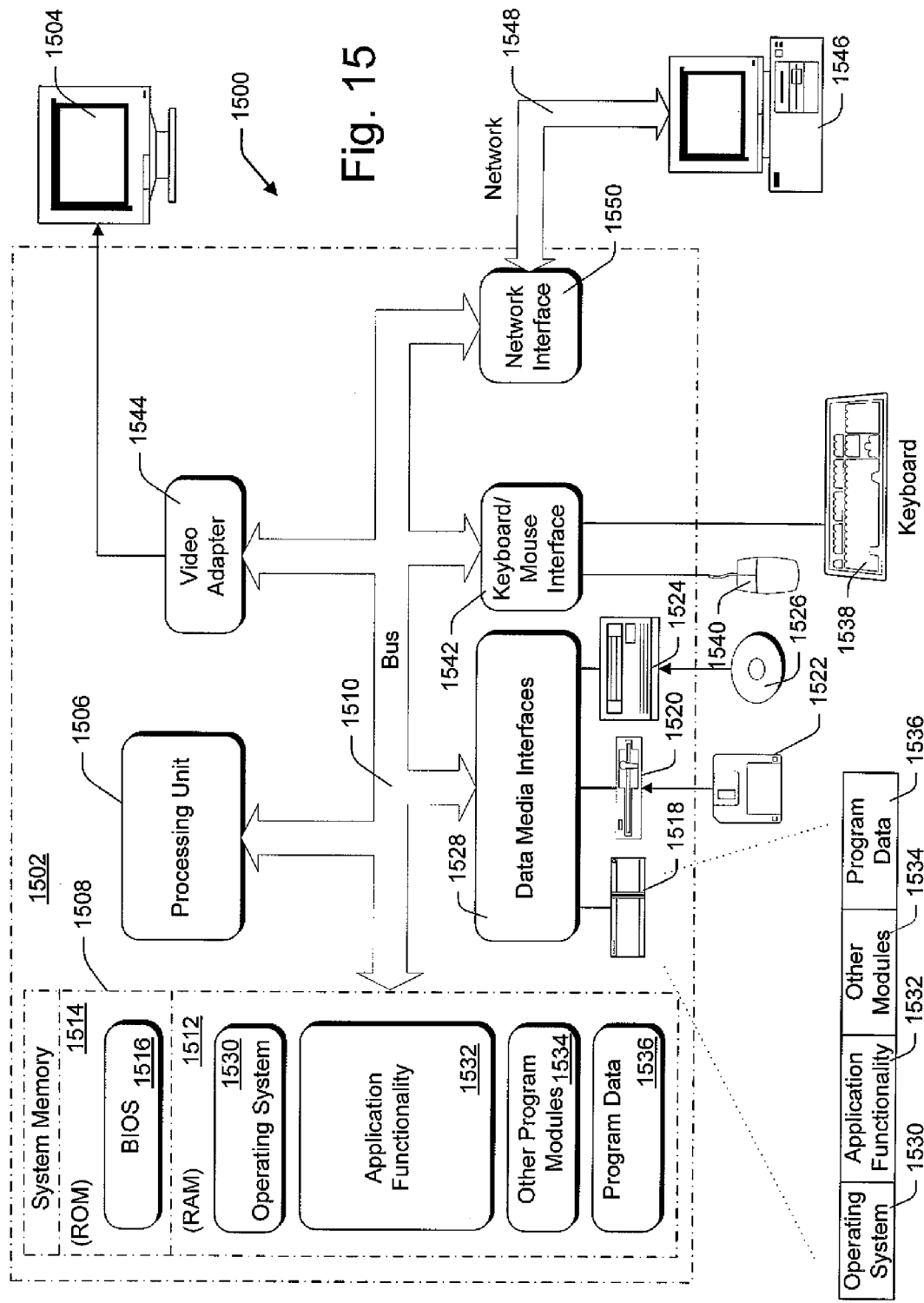
FIG. 15 shows an exemplary computer environment for implementing aspects of the system of FIG. 1.

FIG. 15 provides information regarding an exemplary computer environment 1500 that can be used to implement any of the processing functions described in the proceeding sections, such the first device 102, the second device 104, any provider of the BUIA 106 (such as a website server system), the interface provider 108, the RPF 110, and so on.

The computing environment 1500 includes a general purpose or server type computer 1502 and a display device 1504. However, the computing environment 1500 can include other kinds of computing equipment. For example, although not shown, the computer environment 1500 can include handheld or laptop devices, set top boxes, game consoles, mainframe computers, etc. Further, FIG. 15 shows elements of the computer environment 1500 grouped together to facilitate discussion. However, the computing environment 1500 can employ a distributed processing configuration. In a distributed computing environment, computing resources can be physically dispersed throughout the environment.

Exemplary computer 1502 includes one or more processors or processing units 1506, a system memory 1508, and a bus 1510. The bus 1510 connects various system components together. For instance, the bus 1510 connects the processor 1506 to the system memory 1508. The bus 1510 can be implemented using any kind of bus structure or combination of bus structures, including a memory bus or memory controller, a peripheral bus, an accelerated graphics port, and a processor or local bus using any of a variety of bus architectures.

Computer 1502 can also include a variety of computer readable media, including a variety of types of volatile and non-volatile media, each of which can be removable or non-removable. For example, system memory 1508 includes computer readable media in the form of volatile memory, such as random access memory (RAM) 1512, and non-volatile memory, such as read only memory (ROM) 1514. ROM 1514 includes an input/output system (BIOS) 1516 that contains the basic routines that help to transfer information between elements within computer 1502, such as during start-up. RAM 1512 typically contains data and/or program modules in a form that can be quickly accessed by processing unit 1506.

Other kinds of computer storage media include a hard disk drive 1518 for reading from and writing to a non-removable, non-volatile magnetic media, a magnetic disk drive 1520 for reading from and writing to a removable, non-volatile magnetic disk 1522 (e.g., a "floppy disk"), and an optical disk drive 1524 for reading from and/or writing to a removable, non-volatile optical disk 1526 such as a CD-ROM, DVD-ROM, or other optical media. The hard disk drive 1518, magnetic disk drive 1520, and optical disk drive 1524 are each connected to the system bus 1510 by one or more data media interfaces 1528. Alternatively, the hard disk drive 1518, magnetic disk drive 1520, and optical disk drive 1524 can be connected to the system bus 1510 by a SCSI interface (not shown), or other coupling mechanism. Although not shown, the computer 1502 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 1502. For instance, the readable media can store the operating system 1530, application-specific functionality 1532, other program modules 1534, and program data 1536.

The computer environment 1500 can include a variety of input devices. For instance, the computer environment 1500 includes the keyboard 1538 and a pointing device 1540 (e.g., a "mouse") for entering commands and information into computer 1502. The computer environment 1500 can include other input devices (not illustrated), such as a microphone, joystick, game pad, satellite dish, serial port, scanner, card reading devices, digital or video camera, etc. Input/output interfaces 1542 couple the input devices to the processing unit 1506. More generally, input devices can be coupled to the computer 1502 through any kind of interface and bus structures, such as a parallel port, serial port, game port, universal serial bus (USB) port, etc.

The computer environment 1500 also includes the display device 1504. A video adapter 1544 couples the display device 1504 to the bus 1510. In addition to the display device 1504, the computer environment 1500 can include other output peripheral devices, such as speakers (not shown), a printer (not shown), etc.

Computer 1502 operates in a networked environment using logical connections to one or more remote computers, such as a remote computing device 1546. The remote computing device 1546 can comprise any kind of computer equipment, including a general purpose personal computer, portable computer, a server, etc. Remote computing device 1546 can include all of the features discussed above with respect to computer 1502, or some subset thereof.

Any type of network 1548 can be used to couple the computer 1502 with remote computing device 1546, such as the WAN 402 of FIG. 4, a LAN, etc. The computer 1502 couples to the network 1548 via network interface 1550 (e.g., the interface 416 shown in FIG. 4), which can utilize broadband connectivity, modem connectivity, DSL connectivity, or other connection strategy. Although not illustrated, the computing environment 1500 can provide wireless communication functionality for connecting computer 1502 with remote computing device 1546 (e.g., via modulated radio signals, modulated infrared signals, etc.).

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method of sending content to a target address, comprising:
   receiving at least one parameter identifying at least one of a plurality of content sources, the content sources comprising: an application, and a function of an application from which a user is invoking content-forwarding functionality;
   customizing the content-forwarding functionality based on said at least one parameter, to provide content-forwarding functionality customized to the application or application function from which the user interface is invoked; and
   providing the customized content-forwarding functionality to the user, wherein the customized content-forwarding functionality allows the user to forward content to the target address from a plurality of applications;
   invoking the content-forwarding user interface by activating a content-forwarding icon displayed in a base user interface presentation, wherein:
      the base user interface presentation is administered by a base user-interface provider (BUIP),
      the customized content-forwarding is administered by a content-forwarding user-interface provider (CFUIP);
      the content-forwarding icon is associated with an identified information item in the base user interface presentation that the user intends to forward to the target address; and
      the customized content-forwarding functionality comprises at least one content-forwarding user interface presentation with which the user interacts to forward the identified information item to the target address.

2. The method of claim 1, wherein the user invokes the content-forwarding functionality using a first device, and wherein the target address is associated with a second device.

3. The method of claim 2, wherein the first device is a computer and the second device is a mobile telephone.

4. The method of claim 1, further comprising:
   receiving request information from the user, using the customized content-forwarding functionality, which identifies at least the target address; and
   constructing a message, based on the request information, for use in supplying the content to the target address.

5. The method of claim 4, wherein the request information specifies a telephone number associated with the target address.

6. The method of claim 4, wherein the constructing comprises constructing the message based on a URL and text content.

7. The method of claim 6, further comprising forming reference information that is associated with at least the URL, wherein the reference information is sent to the target address in lieu of the URL.

8. The method of claim 4, further comprising:
   determining a preferred mechanism for delivering the message to the target address; and
   forwarding the message to the target address using the preferred mechanism.

9. The method of claim 4, further comprising:
   determining a preferred format for delivering the message to the target address; and
   forwarding the message to the target address using the preferred format.

10. The method of claim 1, wherein said at least one parameter comprises one or more of:
    application information that identifies a base user interface application that is being used by the user;
    application scenario information that identifies a scenario within the base user interface application;
    locale information that identifies a location associated with the target address; or
    partner information that identifies an entity that supplies the base user interface application.

11. The method of claim, 1 wherein the content that is forwarded to the target device comprises one or more of plurality of content types, the plurality of content types comprising: a search result, a map, an image, audio information, configuration information.

12. One or more computer readable media containing machine-executable instructions for implementing the method of claim 1.

13. A system for sending content to a target address, comprising:
    a first device;
    a second device associated with the target address;
    a base user interface application that provides a base user interface presentation;
    an interface provider for providing a content-forwarding user interface presentation, for display to a user at the first device in conjunction with the base user interface presentation; and
    request processing functionality for processing request information entered by the user at the first device, via the content-forwarding user interface presentation,
    wherein the request information enables the request processing functionality to forward content to the second device.

14. The system of claim 13, wherein the first device is a computer and the second device is a mobile telephone.

15. The system of claim 13, wherein the interface provider is configured to customize the content-forwarding user interface presentation based on at least one received parameter that reflects a context in which the user invokes the content-forwarding user interface presentation.

16. The system of claim 13, wherein the request processing functionality is configured to process the request information by constructing a message, based on the request information, for use in supplying the content to the second device.

17. A system for sending content to a target address, comprising:
    a source device with access to content to be sent, wherein the content is at least one of a plurality of types, the plurality of types comprising: a search result, a map, an image, audio information, configuration information;
    a target device associated with a target address;
    a base user-interface application providing a base user-interface, wherein the base user-interface is accessible by a plurality of applications on the source device;
    one or more content-forwarding user-interface providers (CFUIP) providing a content-forwarding user-interface via the source device in conjunction with the base user-interface, wherein the content-forwarding user-interface may accept as input a plurality of content types from a plurality of applications on the source device;
    a request-processing provider (RPP) accepting content-request information and facilitating forwarding of content received from the CFUIP to the target device in a format acceptable to the target device.

* * * * *